United States Patent [19]
Killilea

[11] 3,774,491
[45] Nov. 27, 1973

[54] UNIVERSAL TRIMMING FACILITY
[75] Inventor: Daniel Edward Killilea, Millersville, Pa.
[73] Assignee: Armstrong Cork Company, Lancaster, Pa.
[22] Filed: June 28, 1971
[21] Appl. No.: 157,200

[52] U.S. Cl............................ 83/433, 83/504, 83/428
[51] Int. Cl............................................... B26d 7/26
[58] Field of Search...................... 83/433, 498, 499, 83/504, 428; 143/37 R

[56] References Cited
UNITED STATES PATENTS
1,180,842   4/1916   Goetz................................ 143/37 R
2,713,903   7/1955   Smith.................................... 83/499

Primary Examiner—Donald R. Schran
Attorney—Clifford B. Price

[57] ABSTRACT

Two cutter assemblies are mounted on a screw drive shaft with right and left-hand threads. Rotation of the shaft will cause adjustment of the distance between the two cutter heads. The shaft assembly and cutter heads themselves are adjustable along the axis of the shaft. The assembly is capable of trimming a carpet to varied widths and of a shifting center line.

3 Claims, 1 Drawing Figure

PATENTED NOV 27 1973　　　　　　　　　　3,774,491
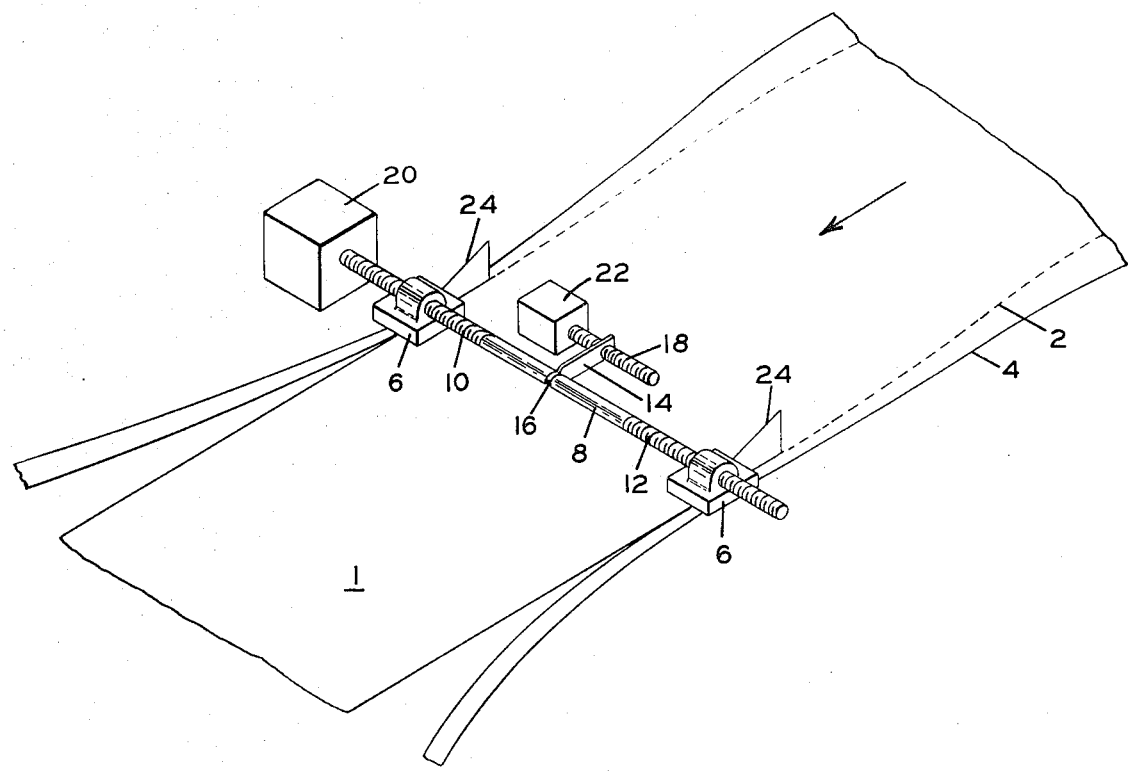
INVENTOR
DANIEL E. KILLILEA
BY
ATTORNEY

UNIVERSAL TRIMMING FACILITY

BACKGROUND OF THE INVENTION

1. Field of the Invention

The invention is directed to a trimmer structure, and more particularly, to a trimmer structure for trimming the edge of carpet.

2. Description of the Prior Art

A number of single head trimming structures exist in the art for the purpose of trimming the edge of carpeting. The simplest form of trimmer is simply a head which is manually moved along the edge of the carpet to trim it in a proper manner. The complexity of trimmers increases up to that shown in U. S. Pat. No. 3,376,778 wherein a structure is provided for moving dual trimming edges to trim both edges of a moving web.

Most trimmers will cut a carpet to a specific width. Some trimmers are used to trim a carpet to the particular edge design of the carpet. Both trimmers either cut a material to a uniform width using dual trimmers or a single trimmer is used to cut the edge of a moving web to conform the edge to a pattern placed upon the moving edge.

SUMMARY OF THE INVENTION

In carpet manufacturing, the edge of the goods will not always match up with the carpet pattern. Therefore, the carpet cannot be simply trimmed square. In the apparatus herein, two cutters are mounted to trim the carpet selvage edge to match up with the carpet pattern edge. Each of the cutters is mounted on a screw arrangement which can rotate to change the distance between the two cutters. The screw arrangement itself is mounted to move back and forth along its longitudinal axis which will be transverse to the carpet movement. A guider structure is positioned forward of the cutters to indicate where the cutters will cut. An operator through manual control can shift the guider to keep it always on register with the pattern edge. This will in turn result in the cutter cutting the carpet along the pattern edge. The mounting for the cutters will permit the individual cutters to be adjusted together, laterally, relative to the moving carpet or independently relative to the moving carpet to adjust the width between the cutters. All movement of the cutters is made so that the cutters will follow the pattern edge of the carpet. Due to the inherent elasticity or growth characteristic of the carpet, the carpet need not always be cut to the exact same width, but can be stretched to the desired width. The important thing is that the pattern always be at the edge of the trimmed carpet.

BRIEF DESCRIPTION OF THE DRAWING

The single FIGURE of the drawing is a perspective view of the apparatus herein.

DESCRIPTION OF THE PREFERRED EMBODIMENT

Carpeting can be made with a printed pattern thereon. Due to the nature of the printing operation and the inherent characteristics of the carpet material, the carpet with the printed pattern will not have the pattern at the edge of the carpet. That portion of the carpet which is between the edge of the pattern and the edge of the carpet material is referred to as selvage. Before the carpeting is sold, the selvage must be removed.

A number of different patterns will exist between the edge of carpet pattern and the tufted and backing edges of the carpet. The carpet pattern may have an hour glass shape relative to the edges of the carpet or the situation could be the reverse. In either case, there is an expanding or contracting of the edges of either the pattern or the carpet relative to a center line which is straight. Another shape could follow the pattern of a sinusoidal curve. In another situation, the carpet itself could have a bowed shape so that the carpet lies flat only when shaped in an arch of anything less than an infinite radius. Any number of other different types of situations could exist wherein the edge of the carpet and the edge of the pattern are not the same and as one extends along the length of the carpet the distances therebetween varies. Since it may be desirable to have the pattern on the carpet such that one piece of carpeting may be placed beside another piece of carpet to secure a pattern match, it is necessary that the edge of the pattern exists at the edge of the carpet. Because of the variations between the carpet width and pattern width and their placement relative to each other, it is not possible simply to cut the carpet to a uniform width. What is necessary is that the carpet be trimmed to the pattern edge and then the natural elasticity of the carpet be used to lay the carpet to a uniform width with the desired pattern match between adjacent pieces of carpeting.

The mechanism below is capable of trimming a carpet which does not have the carpet pattern edge in registry with the carpet edge.

Referring to the single FIGURE of the drawing, the carpet 1 is moving in the direction of the arrow. The carpet selvage edge 4 will not always match up with the carpet pattern edge 2. The distance between the carpet selvage edge and the pattern edge will vary along the length of the carpet. It is necessary that the cutters 6 cut the carpet to conform with the pattern edge 2 and not the selvage edge 4. Each of the cutters 6 is mounted on a screw arrangement 8 which can be moved back and forth transverse of the carpet movement. Right and left-hand screws 10 and 12 are provided on each end of the screw arrangement 8. The cutters are positioned on the screw arrangement such that the right and left-hand screws can move the cutters in conjunction to actually open or narrow down the width of cut between the two cutters. This will compensate for a variation in the pattern design which results in a variation of the width of the pattern.

A shifter bar 14 slides in a groove 16 at the center of the screw arrangement 8. The shifter bar is connected to a screw 18. This screw will cause the shifter bar 14 to shift back and forth transverse to the carpet and this in turn moves the screw arrangement 8 with the cutters back and forth transverse to the carpet movement. An appropriate drive means 20 is provided to move the screw arrangement 8 and the appropriate drive means 22 is used to move the screw 18.

As a result of the above structure, the individual cutters 6 are capable of being moved at the same time to open up or to close down the distance between the two cutters and thereby to vary the width of the carpet. In addition, the screw assembly 8 with the cutters is capable of being moved back and forth transverse to the carpet movement so that both cutters are moved in unison.

A guider assembly 24 is provided forward of each of the cutters to indicate where the cutters would cut the carpet. It is an object of the user of the apparatus herein to keep the indicators 24 positioned on the pattern edge 2. Placing of the guider structure 24 on the edge of the pattern will mean that the cutters will cut along the edge of the pattern. If the carpet pattern grows or shrinks relative to both guiders 24, then the screw arrangement 8 is actuated to move the cutters close together or further apart to thus be able to cut a carpet of a different width. If it is observed that the pattern edges are both moving to one side or the other of the guiders 24, then the total screw arrangement 8 and cutters can be shifted laterally back and forth to compensate for this movement of the pattern edge relative to the guiders.

All of the movement of the cutters is made so that the cutters will follow the pattern edge of the carpet. Due to the inherent elasticity or growth characteristic of the carpet, the carpet need not always be cut to the exact same width, but can be stretched to the desired width. The important thing is that the pattern always be at the edge of the carpet so that there may be pattern matching between adjacent pieces of carpet. The above apparatus is capable of providing the carpet pattern at the carpet edge of the finished carpet.

What is claimed is:

1. A trimmer apparatus fro trimming a sheet material which has a pattern printed thereon, the edge of the pattern not being in registry with the edge of the sheet material and the edge of the pattern being variable in its position relative to the edge of the sheet material, a shifter mechanism for two cutter heads to shift the cutter heads relative to each other to vary the distance therebetween, said shifter mechanism being a screw thread arrangement with right and left-hand screws on the ends thereof, said cutter heads being moved by rotation of the screw arrangement, a means for shifting the shifter mechanism and cutter heads to move that assembly as a unit laterally of the material being trimmed, said means for shifting the screw arrangement being a shifter bar positioned in a groove in the center of the screw arrangement and operated by a means which causes the shifter bar to move the screw arrangement in a direction transverse to the direction the sheet material may be moving relative to the cutter heads, and an indicating means for indicating the cutting position of the cutters so that the operator of the apparatus can shift the cutters to correspond to the edge of the pattern placed upon the sheet material.

2. The apparatus of claim 1 wherein the shifter bar is driven by a screw and this constitutes a portion of the means which causes the shifter bar to move the screw arrangement in either direction transverse to the direction the sheet material may be moving relative to the cutter heads.

3. The apparatus of claim 1 wherein the indicating means for indicating the cutting position of the cutters are guiders positioned forward of each of the cutters to indicate where the cutters would cut the sheet material to be trimmed.

* * * * *